Patented July 4, 1950

2,514,305

UNITED STATES PATENT OFFICE 2,514,305

ALPHA-SUBSTITUTED HALOACRYLIC COMPOUNDS AND THEIR MANUFACTURE

Carl E. Barnes, Belvidere, N. J., assignor to General Aniline & Film Corporation, New York, N. Y., a corporation of Delaware No Drawing. Application June 23, 1945,
Serial No. 601,345

15 Claims. (Cl. 260—78.3)

1

This invention relates to the production of monomeric α-halogen substituted acrylic acids and their derivatives which are capable of yielding colorless polymers and to the color-free polymers from such acids and their derivatives. More particularly, the invention relates to the preparation of esters of α-chloracrylic acids, and especially methyl α-chloracrylate, which are capable of forming colorless polymers and to the color-free polymers obtained therefrom.

A great variety of α-halogen substituted acrylic compounds have been described in the art. The lower alkyl esters of α-halogen substituted acrylic acids are of particular interest since their polymers, especially that of methyl α-chloracrylate, possess outstanding hardness and a high softening point coupled with thermoplastic properties which render them highly desirable in the field of plastics. To obtain the highest degree of hardness in the polymer, it is necessary to heat the polymer at a temperature of above 100° C. for a considerable length of time. Unfortunately, this heating results in the formation of a strong yellow discoloration in the polymer. The discoloration also occurs when the polymer is permitted to stand at room temperature for any considerable length of time. The exposure of the polymer to ultra-violet light also results in a strong discoloration. As a result of the tendency of the polymer to discolor, its use as a plastic material has been seriously limited. For this reason, it finds no practical use as a substitute for glass, particularly in the field of optical glass, such as lenses, prisms, windows, and windshields.

Attempts to obtain a polymer from α-halogen substituted acrylic acids and their derivatives which is free from the tendency to discolor have heretofore proved to be unsuccessful. While various procedures for eliminating the tendency to discolor are proposed in the prior art, complete prevention of color is not obtained. Thus, in United States Patent No. 2,314,443, granted to Crawford, the discoloration of the polymer is stated to be due to the presence in the monomer of traces of so-called autooxidation products. In this patent it is proposed to reduce the tendency to discolor by removing the autooxidation products by distilling the monomer in a vacuum in the absence of oxygen and then carrying out the polymerization under anaerobic conditions. Another proposal made in this patent is to destroy the autooxidation products by use of various reducing agents or compounds having a labile oxygen atom. However, a polymer free from the tendency to discolor is not obtained as

2 is pointed out in the patent. Thus, while diminution in color formation is obtained, the best polymer obtained is still discolored as measured by the Lovibond Tintometer, having a color of red 0.3 Lovibond unit and of yellow 0.8 Lovibond unit.

In United States Patent No. 2,345,126, it is stated that while by practicing the process of Patent No. 2,314,443, considerable improvements are achieved in diminishing the extent of color formation in the polymer, complete suppression of the yellow color does not generally result. It is proposed in Patent No. 2,345,126 to further reduce this tendency to develop color. According to this patent, esters of α-haloacrylic acids which have been rendered substantially free from autooxidation products have added thereto a polyhydric alcohol or partial esters or ethers thereof as a stabilizer. In this patent, the least colored product obtained still has a total of 0.8 Lovibond unit when heated for 16 hours at a temperature of 100 to to 110° C. and 1.4 Lovibond units when heated at the same temperature for 160 hours.

In U. S. Patent 2,247,790 granted to Strain et al., it is proposed to overcome the tendency to form color in the polymer by conducting the polymerization under substantially anhydrous conditions. However, while the patent states that a clear and water-white polymer is obtained, I have found that the polymer tends to discolor when heated for long periods of time or subjected to ultra-violet light.

It is an object of the present invention to provide compositions of monomers of α-halogen substituted acrylic compounds and more particularly the esters thereof which are capable of yielding polymers that are free from color and show no tendency to subsequently develop color when subjected to heat and/or ultra-violet light, or upon standing at ordinary room temperatures for extended periods of time.

It is a further object of the present invention to provide polymers of α-halogen substituted acrylic acid compounds and more particularly the esters, which are color-free and free from the tendency to become discolored when subjected to heat and/or ultra-violet light or upon standing for extended periods of time.

According to copending U. S. application Serial No. 601,342, filed June 23, 1945, it has been determined that the cause of color formation in α-halogen substituted acrylic resins is due to the presence of oxalyl halide compounds, such as, for example, methyl oxalyl chloride in the case of methyl α-chloracrylate monomer. It is proposed therein, to incorporate into the monomer any substance which in itself does not introduce color and which converts the oxalyl halide compound into a non-color-forming compound, thereby resulting in a monomer capable of forming a colorless polymer.

According to my invention, I have found esters of organic hydroxy acids to be effective agents for rendering inert the oxalyl halide present in the monomer and to result in a monomer capable of forming a colorless polymer. The esters may be of a polymerizable or non-polymerizable nature. In general, the aliphatic, cycloaliphatic, and aromatic esters of hydroxy acids are suitable for the purposes of my invention. As examples of polymerizable esters may be mentioned the vinyl and substituted vinyl esters of organic hydroxy acids. As exemplary of non-polymerizable esters, there may be mentioned the alkyl, hydroxyalkyl, cyclohexyl, and aryl esters of organic hydroxy acids.

In practicing my invention, there is incorporated in the monomeric α-halogen substituted acrylic acids or their derivatives a small amount of the ester of a hydroxy acid. As specfic examples of such esters may be mentioned: methyl, ethyl, β-hydroxyethyl, propyl, phenyl, cyclohexyl, vinyl, isopropenyl, allyl, methallyl, crotyl, and cinnamyl esters of glycollic, hydracrylic and similar hydroxy acids.

The hydroxy acid ester may be incorporated in the monomeric α-haloacrylic acid compound by simply dissolving it in the monomer before polymerization. Amounts as little as 0.1% based on the weight of the monomer are sufficient to prevent discoloration in the polymer under suitable conditions. In general, a small amount ranging from 0.1 to 4% is effective for this purpose. If larger amounts are utilized, exceeding the miscibility of the ester in the polymer, a compatible homogeneous polymer having complete freedom from any cloudiness or milkness is not obtained. Cloudiness or milkiness result when larger amounts than the limit of solubility of the ester in the monomer are used. We prefer to use those esters of hydroxy acids which are readily soluble and compatible with the polymer in amounts up to at least 0.1%. Following the incorporation of the ester in the monomer, the resulting composition may then be polymerized by any suitable polymerization process.

The present invention results in many advantages. Thus, it is unnecessary to carry out the polymerization of the monomer in the absence of air or to take precautions against hydrolysis. My process also makes it unnecessary to remove or destroy the autooxidation products in the monomer as proposed in Patents Nos. 2,314,443 and 2,345,126. It becomes also unnecessary to utilize a freshly distilled monomer. Rigid precautions need not be taken to prevent exposure of the monomer to air either during storage or polymerization. Nor it is necessary to dehydrate the monomer prior to distillation.

Special advantages are obtained by the use of the polymerizable esters of hydroxy acids. These compounds in addition to eliminating any tendency of the polymer to discolor also interpolymerize with the α-haloacrylic acid derivative and, therefore, do not plasticize the finished polymer. In addition, they do not lower the softening temperature of the polymer or decrease the surface hardness thereof. Compounds which produce a plasticizing effect may be undesirable for many uses where high softening point, scratch resistance, and grindability are desired. Thus, my invention not only results in the elimination of the color, but also results in a polymer which is free from bubbles, has a high softening point, and unusual scratch resistance coupled with highly desirable machining and polishing characteristics.

The monomers which I use may be obtained by usual methods. It is preferred to purify the monomer prior to polymerization by the ordinary fractional distillation methods to remove as much of the various impurities therein as possible. Alpha-haloacrylic acids and their esters may, for example, be prepared by dehydrohalogenating α,α- or α,β-dihalopropionic acid or its esters. Thus, monomeric methyl α-chloracrylate may be prepared by dehydrochlorinating methyl α,α- or α,β-dichloropropionate.

The addition of the hydroxy acid ester to the monomer is equally effective in preventing discoloration of the polymer whether the polymer is produced by thermal- or photo-polymerization methods. In accordance with my invention, for example, massive cast pieces of polymers of esters of α-haloacrylic acids may be made which possess exceptional clarity, transparency, and freedom from color and maintain these properties even upon exposure to ultra-violet light and/or elevated temperatures for extended periods of time.

The quantity of the hydroxy acid ester added also depends to some extent upon the atmospheric oxygen with which the monomer is likely to come into contact during the polymerization. The addition of larger amounts of the ester will allow the monomer to tolerate larger quantities of oxygen without the formation of color. Thus, for example, when larger amounts of the ester are added to the monomer, polymerization may be carried out in vessels unsealed from the air and in which no especial effort is made to exclude air during the polymerization. Under these conditions, on the other hand, if the ester is omitted, a polymer is obtained which develops a strong yellow color upon heating and/or exposure to light or simply on standing under ordinary room conditions for an extended period of time. If the polymerization is carried out with more care in excluding air, correspondingly less of the ester need be added to the monomer.

The present invention is not only applicable for mass polymerization of α-haloacrylic acid compounds, but is also effective to prevent the formation of color in the polymer produced by other methods as, for example, in the case where the polymerization is carried out in the presence of solvents for the monomer alone, or for the monomer and polymer, or in granular or in emulsion polymerization methods. Thus, the addition of a small amount of a hydroxy acid ester to the solution, or to the monomer in the case of granular polymerization, is highly effective for producing polymers which are free from the tendency to discolor.

The following examples are illustrative of my invention, the parts being by weight.

*Example 1*

To 100 parts of methyl α-chloracrylate were added 2 parts of the vinyl ester of glycollic acid together with .002 parts of benzoyl peroxide. The addition was effected by mixing the two without the exclusion of air, and the resulting mixture was polymerized in a glass tube and sealed to prevent further contact with air. The polymerization was carried out by heating for 24 hours at 65° C., after which time the temperature was raised to 110° C. for an additional 24-hour period. At the end of this time, the glass was broken away from the resin and a hard, clear, colorless polymer was obtained. A sample of the same methyl α-chloracrylate polymerized in the same way but without the addition of the vinyl ester of glycollic acid had a distinct yellowish cast.

Example 2

To 100 parts of methyl α-chloracrylate there were added 1.5 parts of the isopropenyl ester of hydracrylic acid and 0.0001 part of benzoyl peroxide. The reagents were mixed together and the resulting mixture polymerized by heating for 24 hours at 35° C. followed by continuing the heating for 12 hours at 65° C. and a final baking at 115° C. for 24 hours. A hard, clear, colorless polymer was obtained which was free from bubbles.

Example 3

The vinyl ester of hydracrylic acid was substituted for the isopropenyl ester of Example 2 and after polymerization in the same way a hard, color-free and clear resin was obtained.

Example 4

The methyl ester of hydracrylic acid was substituted for the vinyl ester of glycollic acid in Example 1. After polymerization following the same procedure as in Example 1, a clear, color-free polymer of exceptional hardness was obtained.

Example 5

Beta-hydroxy-ethyl ester of hydracrylic acid was substituted for the vinyl ester of glycollic acid in Example 1. The mixture was polymerized in the same manner. The resulting polymer was clear and color-free.

Example 6

In place of the isopropenyl ester of hydracrylic acid of Example 2, there is substituted the cyclohexyl ester of glycollic acid and the polymerization is carried out in the same manner. A color-free polymer is obtained.

While the invention has been described in the specific examples in connection with methyl α-chloracrylate, it is also applicable to other α-halogen substituted acrylic acid compounds. By the term "α-halogen substituted acrylic acid compounds," I intend to include the esters, amides, substituted amides, and nitriles of haloacrylic acids, as well as the acids. Among examples of such compounds with which the present invention is effective in addition to that already disclosed in the examples may be mentioned: ethyl, propyl, isopropyl, butyl, tertiary-butyl, phenyl, benzyl, cyclohexyl, allyl, and methallyl esters of α-chlor- and α-bromacrylic acids; α-brom- and α-chloramides or N-substituted derivatives thereof, such as α-chloracrylamide, N-methyl α-chloracrylamide, and the corresponding α-bromo compounds; and α-chloracrylonitrile and the like. In general, my invention has been found effective to eliminate color formation in polymers prepared from polymerizable α-halogen substituted acrylic acid compounds.

The temperature of polymerization may range from 20° C. or below to 120° C. or more, although the preferred range is approximately 35 to 65° C. The subsequent heating step in order to harden the polymer may range from 100 to 120° C. and the time from approximately 8 to 24 hours.

Either ultra-violet light or any of the conventional catalysts may be used to promote the polymerization in addition to benzoyl peroxide, such as, for example, succinyl peroxide, peracetic acid, and other peroxide- or oxygen-containing catalysts. The catalyst concentration may range within approximately 0.01 to 0.5%.

Since it is apparent that the invention may be varied without departing from the spirit and scope thereof, it is to be understood that it is not limited to the specific embodiments given above, but only in accordance with the appended claims.

I claim:

1. A composition of matter adapted to yield a transparent colorless colorstable polymer upon mass polymerization thereof, said composition consisting of a monomeric α-halogen substituted acrylic acid compound containing 0.1 to 4% of an ester of a monohydroxy monocarboxylic acid of 2 to 3 carbon atoms, whereby the formation of color in the polymer is prevented.

2. A composition of matter adapted to yield a transparent colorless colorstable polymer upon mass polymerization thereof, said composition consisting of methyl-α-chloroacrylate containing 0.1 to 4% of the vinyl ester of glycollic acid, whereby formation of color in the polymer is prevented.

3. A composition of matter adapted to yield a transparent colorless colorstable polymer upon mass polymerization thereof, said composition consisting of methyl-α-chloroacrylate containing 0.1 to 4% of the isopropenyl ester of hydracrylic acid, whereby formation of color in the polymer is prevented.

4. A composition of matter adapted to yield a transparent colorless colorstable polymer upon mass polymerization thereof, said composition consisting of methyl-α-chloroacrylate containing 0.1 to 4% of the β-hydroxyethyl ester of hydracrylic acid, whereby formation of color in the polymer is prevented.

5. A composition of matter adapted to yield a transparent colorless colorstable polymer upon mass polymerization thereof, said composition consisting of methyl-α-chloroacrylate and from 0.1 to 4% of a polymerizable unsaturated aliphatic ester of a monohydroxy monocarboxylic acid of 2 to 3 carbon atoms, whereby the formation of color in the polymer is prevented.

6. A method for the preparation of a transparent colorless colorstable polymer which comprises subjecting to polymerizing influences, in mass polymerization, a composition consisting of an α-halogen substituted acrylic acid compound containing 0.1 to 4% of an ester of a monohydroxy monocarboxylic acid of 2 to 3 carbon atoms, whereby formation of color in the polymer is prevented.

7. A method for the preparation of a transparent colorless colorstable polymer which comprises subjecting to polymerizing influences, in mass polymerization, a composition consisting of an α-halogen substituted acrylic acid compound containing 0.1 to 4% of a polymerizable unsaturated aliphatic ester of a monohydroxy monocarboxylic acid of 2 to 3 carbon atoms, whereby the formation of color in the polymer is prevented.

8. A method for the preparation of a transparent colorless colorstable polymer which comprises subjecting to polymerizing influences, in mass polymerization, a composition consisting of methyl-α-chloroacrylate containing 0.1 to 4% of an ester of a monohydroxy monocarboxylic acid of 2 to 3 carbon atoms, whereby formation of color in the polymer is prevented.

9. A method for the preparation of a transparent colorless colorstable polymer which comprises subjecting to polymerizing influences in mass polymerization, a composition consisting of methyl-α-chloroacrylate containing 0.1 to 4% of the vinyl ester of glycollic acid, whereby the formation of color in the polymer is prevented.

10. A method for the preparation of a transparent colorless colorstable polymer which comprises subjecting to polymerizing influences in mass polymerization, a composition consisting of methyl-α-chloroacrylate containing 0.1 to 4% of the isopropenyl ester of hydracrylic acid, whereby the formation of color in the polymer is prevented.

11. A method for the preparation of a transparent colorless colorstable polymer which comprises subjecting to polymerizing influences in mass polymerization, a composition consisting of methyl-α-chloroacrylate containing 0.1 to 4% of the β-hydroxyethyl ester of hydracrylic acid, whereby the formation of color in the polymer is prevented.

12. A colorless colorstable transparent mass polymer from a composition consisting of a polymerizable α-halogen substituted acrylic acid compound containing 0.1 to 4% of an ester of a monohydroxy monocarboxylic acid containing 2 to 3 carbon atoms, whereby the formation of color in the polymer is prevented.

13. A colorless colorstable transparent mass polymer from a composition consisting of methyl-α-chloroacrylate containing 0.1 to 4% of the vinyl ester of glycollic acid, whereby the formation of color in the polymer is prevented.

14. A colorless colorstable transparent polymer mass from a composition consisting of methyl-α-chloroacrylate containing 0.1 to 4% of the isopropenyl ester of hydracrylic acid, whereby the formation of color in the polymer is prevented.

15. A colorless colorstable transparent polymer mass from a composition consisting of methyl-α-chloroacrylate containing 0.1 to 4% of the β-hydroxyethyl ester of hydracrylic acid, whereby the formation of color in the polymer is prevented.

CARL E. BARNES.

REFERENCES CITED

The following references are of record in the file of this patent:

UNITED STATES PATENTS

| Number | Name | Date |
|---|---|---|
| 2,318,959 | Muskat et al. | May 11, 1943 |
| 2,332,899 | D'Alelio | Oct. 26, 1943 |
| 2,337,681 | Pollack | Dec. 28, 1943 |
| 2,340,111 | D'Alelio | Jan. 25, 1944 |